United States Patent [19]

Bobeck et al.

[11] 3,820,092

[45] June 25, 1974

[54] MAGNETIC DOMAIN DETECTOR ARRANGEMENT

[75] Inventors: Andrew Henry Bobeck, Chatham; Frank John Ciak, Roselle Park; Walter Strauss, Summit, all of N.J.

[73] Assignee: Bell Telephone Laboratories Incorporated, Berkeley Heights, N.J.

[22] Filed: Jan. 22, 1973

[21] Appl. No.: 325,508

[52] U.S. Cl......... 340/174 EB, 340/174 TF;174 WA
[51] Int. Cl........................................... G11c 11/14
[58] Field of Search................. 340/174 TF, 174 EB

[56] References Cited

UNITED STATES PATENTS 3,713,120 1/1973 Bobeck et al. ................ 340/174 TF

*Primary Examiner*—James W. Moffitt
*Attorney, Agent, or Firm*—H. M. Shapiro

[57] ABSTRACT

An enhanced output signal is provided by the coupling of a magnetic bubble to a magnetoresistance detector element when the familiar rotating in-plane drive field is set at an amplitude such that the presence of a bubble results in a change in frequency in signal exhibited by the detector element due to the in-plane field. The largest signals yet achieved resulted from an integrated expansion detector, guard rail arrangement with a meandering magnetoresistance element when operated in this manner.

11 Claims, 4 Drawing Figures

MAGNETIC DOMAIN DETECTOR ARRANGEMENT

FIELD OF THE INVENTION

This invention relates to the detection of magnetic single wall domains, most notably those called magnetic bubbles.

BACKGROUND OF THE INVENTION

Magnetic bubbles and the movement thereof in a layer of magnetic material in a "field access" mode of operation are described in U.S. Pat. No. 3,534,347, of A.H. Bobeck issued Oct. 13, 1970. Field access arrangements are characterized by a pattern of magnetically soft elements responsive to a magnetic field reorienting in the plane of bubble movement to generate changing pole patterns. The pole patterns modify a uniformly generated bias field, of a polarity to constrict domains, to produce a changing pattern of field gradients operative to move domains along a path defined by the pattern of elements.

Many arrangements have been disclosed for detecting the presence of magnetic domains moved, for example, in the field access mode. One highly attractive arrangement is disclosed in our U.S. Pat. No. 3,702,995, issued Nov. 14, 1972. This patent describes a field access arrangement which employs a "fine-grained" pattern of magnetic elements for defining consecutive stages of an "expansion detector." The pattern of elements is defined by closely spaced chevron-shaped permalloy strips with an increasingly larger number of elements in consecutive stages of the detector. The increasingly larger number of elements are operative to expand a bubble laterally as it is advanced along the path of movement. A magnetoresistance element couples the expanded domain to provide relatively large output signals.

The greater the number of elements in the stage coupled by the magnetoresistance element, the larger the lateral expansion of the domain and the larger the associated output signal. But this expansion requires a relatively large portion of the surface area of the epitaxial layer in which bubble movement occurs. Our copending application Ser. No. 240,651 filed Apr. 3, 1972, and now U.S. Pat. No. 3,713,120 describes a field access, fine-grained, expansion detector where the magentoresistance element meanders through a stage of the detector including within it at least a portion of each element in the stage. The effective length of the magnetoresistance element is increased greatly, in this manner, with no additional use of surface area.

In the most attractive expansion detector arrangement to date, the expanded domain in the detector stage is adjacent a "guard rail" which is operative to move domains from an active field access circuit to nonoperative areas of the bubble layer. The guard rail typically is defined by a pattern of chevron elements oriented to move domains outwardly from a circuit encompassed thereby and is operative in response to the reorienting in-plane field common to field access arrangements. The detector stage is formed by photolithographic means adjacent the guard rail so that the latter functions as a set of consecutive stages of the expansion detector. An integrated expansion detector guard rail structure is disclosed in copending application Ser. No. 309,204, filed Nov. 24, 1972, for A. H. Bobeck.

In arrangements where an expansion detector is integrated into the guard rail and the magnetoresistance elements are of meandering configuration, output signals of the order of fifteen millivolts are generated typically.

BRIEF DESCRIPTION OF THE INVENTION

The present invention is based on the discovery that the magnetoresistance detector element is operative in two different modes depending on the amplitude of the in-plane field. The first mode is characterized by a detector signal which is essentially at a frequency equal to the rotating field frequency. The second mode is characterized by a signal which is double the frequency of the in-plane field. If the amplitude of the in-plane field is set at a point below that at which the frequency transition occurs, the presence of a bubble is operative to effect the transition. The output signal is observed conveniently at a time T1 when the signal is, say, negative due to the presence of a bubble because of the shift through the transition, rather than positive. A strobe pulse having a duration small compared to the period of the output signal and applied at time T1 ensures that the maximum signal is achieved. For an integrated expansion detector and guard rail arrangement with a meandering magnetoresistance element output signals of the order of fifty millivolts have already been achieved.

DETAILED DESCRIPTION

Figure 1:
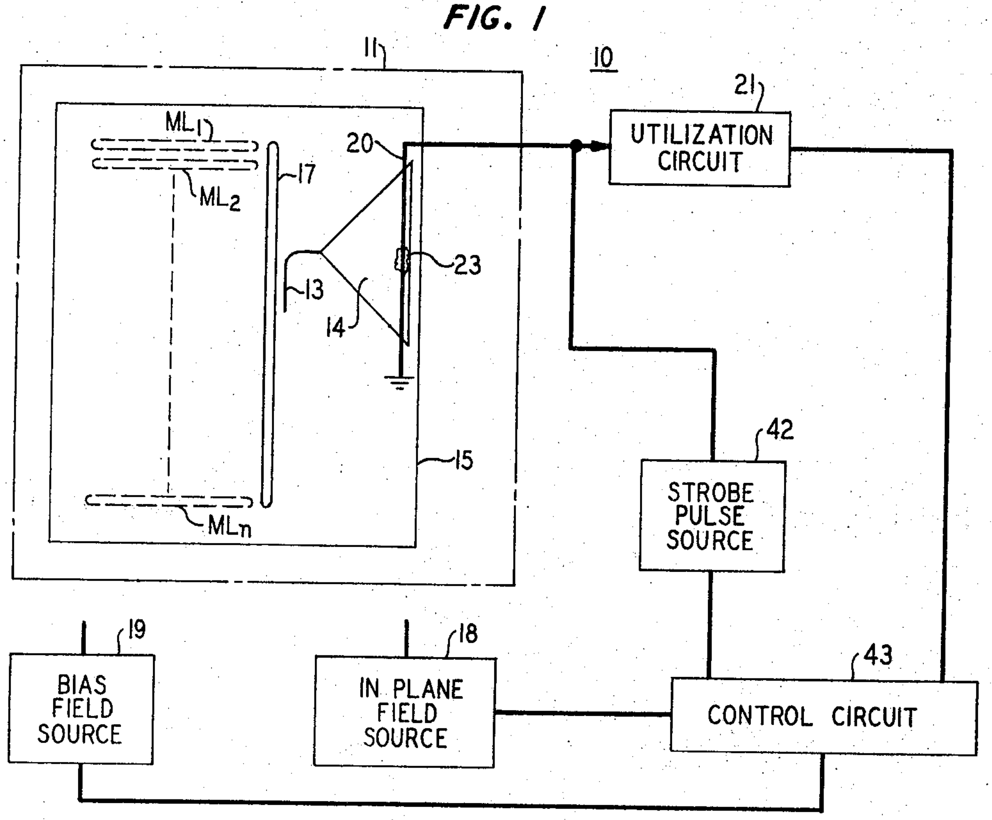
FIG. 1 is a schematic top view of an integrated expansion detector, guard rail arrangement in accordance with an embodiment of this invention.

FIG. 1 shows a magnetic arrangement 10 including a detector arrangement in accordance with this invention. The arrangement comprises a layer 11 of a material in which single wall domains can be moved. A pattern of elements of magnetically soft material (typically permalloy) defines a domain propagation channel, an expansion detector and a guard rail, in a familiar manner as taught in the aforementioned patents and copending applications, and herein merely indicated at 13, 14, and 15, respectively.

The figure indicates a familiar bubble memory organization which comprises a plurality of recirculating loops $ML_1$ $ML_n$ operative to transfer information selectively to a single temporary store (or loop 17). The organization is defined by the pattern of elements operative in a mode which is commonly known as major-minor mode responsive to the in-plane field reorientations. Bubbles are advanced to the expansion detector 14 via channel 13 to which bubbles are transferred (or replicated) by familiar means not shown herein.

The rotating (or pulsed) in-plane field is suppled by a source represented by block 18 in FIG. 1. A bias field operative to maintain bubbles at a preselected operative diameter is supplied by a source represented by block 19 of FIG. 1.

A domain is assumed to advance upward along channel 13 and to move to the right into expansion detector 14 in response to the in-plane field. The detector 14 includes a number of stages with increasing numbers of elements operative to elongate a bubble laterally as it is advanced to the right. The consecutive stages with increasingly larger numbers of elements is represented by the triangular envelope designated 14 in FIG. 1 as indicated above.

A magnetoresistance element 20 couples layer 11 at a detector stage of detector 14 where the number of elements is typically largest. The magnetoresistance element is connected between a utilization circuit 21 and ground as shown in the figure for applying to circuit 21 signals indicative of the presence or absence of a bubble at the detector stage of detector 14.

Figure 2:
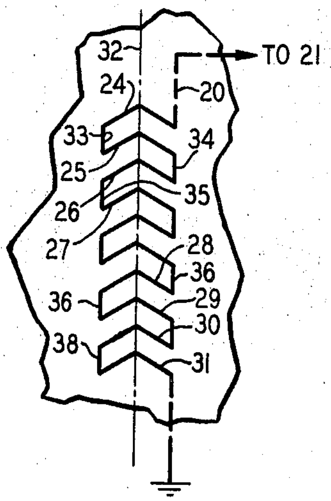
FIG. 2 is a top view of a portion of the pattern of magentic elements which define the detector stage of the arrangement of FIG. 1.

A portion of the detector stage at area 23 of FIG. 1 is shown expanded in FIG. 2. The figure shows a number of chevron elements 24 through 31 disposed in parallel along an imaginary axis 32 through their apices. The magnetoresistance element can be seen to include each of the chevron elements as well as vertical interconnection sections 33 through 38. It is contemplated that the vertical sections are formed by the same photolithographic process which simultaneously forms the chevron elements as well as all the remaining features in FIG. 1.

Figure 3:
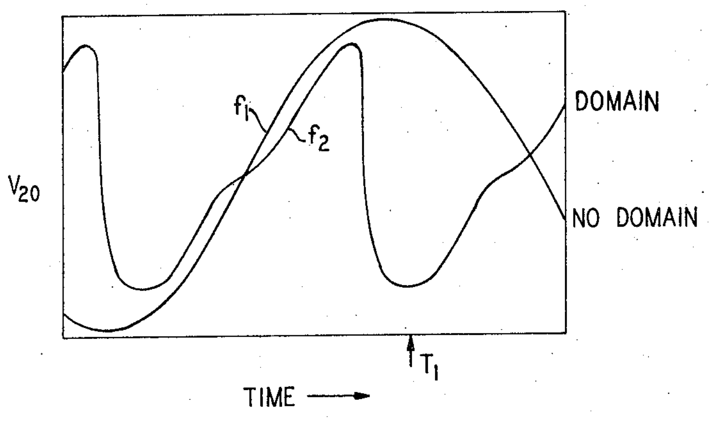
FIGS. 3 and 4 are pulse diagrams for the arrangement of FIG. 1 each showing the output signals for the presence and absence of a bubble in accordance with this invention.

A domain moving to the right in FIG. 1 advances to a position in the detector stage shown in FIG. 2. It is important in accordance with this invention that the amplitude of the in-plane field of frequency *f*1 is selected at a value for which the output signal V20, applied by magnetoresistance element 20 to utilization circuit 21, appears essentially as a sinusoid with frequency *f*1. The sinusoidal output signal (*f*1) is shown in FIG. 3 and a Fourier analysis of the signal indicates that all terms except the *f*1 term are negligible.

Figure 4:
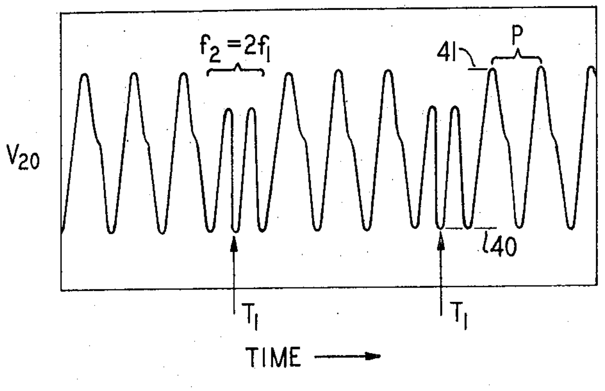

The presence of a domain in the detector stage causes a change in the frequency of the output signal to a frequency *f*2 as indicated most clearly in FIG. 4 for a period P of the in-plane field. Frequency *f*2 is double that of the in-plane field and is so designated in FIG. 4. The output of the magnetoresistance element conveniently is strobed at time T1 during a portion of this (*f*2) period to apply to utilization circuit 21 a negative signal of a level indicated at 40 in FIG. 4. If a bubble is absent at the time of the strobe pulse, a positive signal of a level indicated at 41 in FIG. 4 is exhibited. A strobe pulse is supplied by a familiar source represented in FIG. 1 by block 42.

Sources 18, 19, and 42 and circuit 21 of FIG. 1 are under the control of a control circuit represented by block 43 of FIG. 1. The various sources and circuits may be any such elements capable of operating in accordance with this invention.

The amplitude of the in-plane field herein is selected at a level below that at which the transition from *f*1 to *f*2 in the output signal occurs as has been stated herein before, but, the amplitude is selected sufficiently close to that transition so that the presence of a bubble provides the additional field at the detector stage to cause the transition.

The latitude in selecting the operating amplitude of the in-plane field is a function of the placement of the vertical sections of the magnetoresistance element (see FIG. 2) and the width (and thickness) of the chevron elements and of those sections. The movement of the vertical sections toward the axis 32 of the detector stage, for example, lowers the requisite in-plane field amplitude at which the transition occurs. A lowering of the requisite operating amplitude reduces the power requirement. A relatively large separation between the operating amplitude and the amplitude at which the transition occurs is desirable because the larger the separation, the larger the margins for in-plane field excursions.

The timing of the strobe pulse can be seen to be important from FIG. 4. It is also important that the duration of the strobe pulse be only a small portion of the period P of the output signal, typically from about (P/10) to (P/20) also as indicated in FIG. 4. In practice, the magnetoresistance element applies its signal to one input of an AND gate, via an amplifier, and the strobe is applied to the second input to the gate.

In one specific example, a layer of yttrium europium garnet was grown by liquid phase epitaxial techniques on a substrate of gadolinium gallium and exhibited a magnetization ($4\pi M_s$) of about 150 gauss. The layer was 7 microns thick and exhibited bubbles having a nominal diameter of 6 microns in the presence of a bias field of 61 oersteds. An intergrated expansion detector-guard rail arrangement of the type shown in FIGS. 1 and 2 was defined by chevron elements having widths of 2.3 microns, a period of 25 microns and a thickness of 0.4 microns. The vertical sections of FIG. 2 interconnected the ends of adjacent chevron elements in pairs. In response to a 100 kilohertz in-plane field of 23 oersteds, signals as shown in FIGS. 3 and 4 were observed in the presence and absence of a bubble. An output signal of about 50 mV was observed at time T1 when the circuit was strobed with a pulse of 6 mA and a duration of 1 microsecond. The vertical sensitivity of the detector was 20 millivolts per centimeter.

What has been described is considered merely illustrative of the principles of this invention. Accordingly, various modifications thereof can be devised by those skilled in the art in accordance with this invention as encompassed by the following claims.

What is claimed is:

1. Magnetic apparatus comprising a layer of material in which single wall domains can be moved along a multistage path including a detector stage in response to a magnetic field having a first amplitude below a critical value and reorienting in the plane of said layer at said frequency *f*1, a magnetic detector element coupled to said layer at said detector stage in a manner to exhibit a periodic output signal of frequency *f*1 in the absence of a domain there and having a geometry to exhibit a periodic output signal of frequency *f*2 = 2*f*1 in the presence of a domain for a reorienting field with an amplitude of less than said critical value thereby periodically defining a time T1 during said output signal when said signal of frequency *f*1 is a first polarity and said signal of frequency *f*2 is of a second polarity in response to the absence and presence of a domain in said detector stage respectively.

2. Apparatus in accordance with claim 1 also including means for strobing said detector at times T1.

3. Apparatus in accordance with claim 2, including a pattern of magnetically soft elements for defining said path including said detector stage.

4. Apparatus in accordance with claim 3 wherein said pattern of elements comprises a succession of stages including said detector stage having increasingly larger numbers of elements for expanding a domain moved therealong.

5. Apparatus in accordance with claim 4 wherein the elements of said succession of stages comprises a fine-grained pattern of chevron-shaped elements.

6. Apparatus in accordance with claim 5 wherein said magnetic detector element comprises at least portions of the elements in said detection stage and interconnecting sections between said elements in said detection stage in pairs.

7. Apparatus in accordance with claim 6 wherein said interconnecting sections interconnect the ends of adjacent elements in said detection stage in pairs.

8. Apparatus in accordance with claim 7 wherein said output signals have a period P and said strobe pulse has a duration of only a small fraction of P.

9. Apparatus in accordance with claim 8 wherein said strobe pulse has a duration of from (P/10) to (P/20).

10. Magnetic apparatus comprising a layer of material in which single wall domains can be moved along a multistage path including a detector stage in response to a magnetic field having a first amplitude below a critical value and reorienting in the plane of said layer at a frequency $f1$, a magnetic detector element coupled to said layer at said detector stage in a manner to exhibit a periodic output signal of a frequency $f1$ and of a frequency $f2 = 2f1$ for values of said first amplitude below and above said critical value respectively, means for providing said reorienting field of said first amplitude at a value sufficiently below said critical value so that said output signal is of frequency $f1$ in the absence of a domain and of frequency $f2$ in the presence of a domain.

11. Apparatus comprising a layer of material in which single wall domains can be moved along a path including a detector stage in response to a magnetic field having a first amplitude and rotating in the plane of said layer at a first frequency, means coupled to said layer at said detector stage for detecting the presence and absence of a domain, said last-mentioned means having a geometry for exhibiting an output signal of said first frequency and of a second frequency different from said first frequency in response to the absence and presence of a domain in said detector stage respectively in combination with means for detecting said change in frequency.

* * * * *